Figure 1:
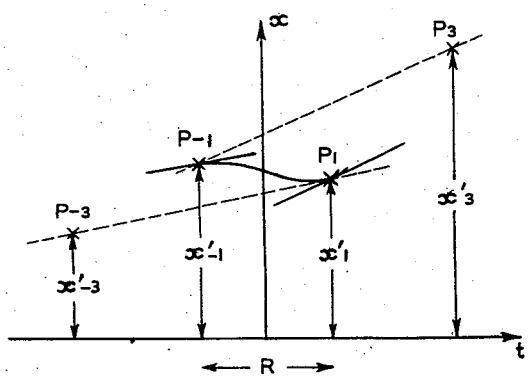

Feb. 27, 1962  A. J. S. UDALL  3,022,953
INTERPOLATORS, ESPECIALLY FOR CONTROL MECHANISM
FOR AUTOMATIC MACHINES
Filed Oct. 22, 1956  5 Sheets-Sheet 1

Inventor
A. J. S. Udall

Feb. 27, 1962 A. J. S. UDALL 3,022,953
INTERPOLATORS, ESPECIALLY FOR CONTROL MECHANISM
FOR AUTOMATIC MACHINES
Filed Oct. 22, 1956 5 Sheets-Sheet 5

Inventor
A. J. S. Udall
By Glascock Downing Seebold
Attys.

United States Patent Office 3,022,953
Patented Feb. 27, 1962

3,022,953
INTERPOLATORS, ESPECIALLY FOR CONTROL MECHANISM FOR AUTOMATIC MACHINES
Anthony John Shawcross Udall, Addlestone, England, assignor to Electric & Musical Industries Limited, Hayes, England, a company of Great Britain
Filed Oct. 22, 1956, Ser. No. 617,608
Claims priority, application Great Britain Oct. 27, 1955
6 Claims. (Cl. 235—197)

This invention relates to interpolators, especially though not exclusively for control mechanisms for automatic machines.

In United States application Serial No. 459,814, now Patent No. 2,928,604, various devices are proposed for producing quadratic and linear interpolation. These devices are especially intended for control mechanisms for automatic machines and derive a continuously variable output signal from sets of discrete reference points. The reference points are provided as sets of analogue signals representing discrete values of the variable being interpolated. The output signal is derived by linear interpolation, that is constructing straight lines through adjacent pairs of reference points or by parabolic interpolation, that is by constructing parabolas defined by consecutive groups of three reference points. The form of the curve over which interpolation is effected is termed the interpolation function. The interpolated curves provided by these devices may suffer however from undesired discontinuities in the form of "jumps" or "corners" at points corresponding to changes in the set of reference points from which the output is derived.

The object of the present invention is to provide an interpo'ating device which provides an output which is free from undesired discontinuities at change over points.

According to the present invention there is provided an interpolating device wherein at least four input points and at least one output point is interconnected by at least three transformers which are so arranged that on application of alternating electrical signals to said input points, output signals are set up at the output point representing co-ordinates of points on a curve which by choice of the applied signals can be caused to pass through two desired points and have desired slopes at these points.

One form of interpolating device may employ two sets of transformers, each comprising a series of transformer windings so arranged that they set up an interpolation function. In this case the input signals representing reference points for one set of transformers are free to be changed whi'st output signals are being derived from the other set. Undesired discontinuities in the form of "jumps" at changeover po:nts may be eliminated by constraining the interpolation function to have a particular value at each end of its range and making the value at the end of one range common to that at the beginning of the next range, that is, at points where the output changes from being derived from one set of transformers to being derived from the other set. This may be achieved by making these changes take place at discrete reference points. Undesired discontinuities in the form of "corners" may be eliminated by constraining the interpolation function to have a particular slope at each end of its range, so that the slope at the end of the range for one bridge is the same as that at the beginning of the range for the other bridge. The slopes are determined by the reference signals. The interpolator is therefore required according to the invention to be subject to these four constraints so that the interpolator must have at least four degrees of freedom. This implies that the interpo!ation function contains at least four parameters corresponding to these degrees of freedom. These parameters may be determined for example by providing a corresponding number of reference signals.

Figure 2:
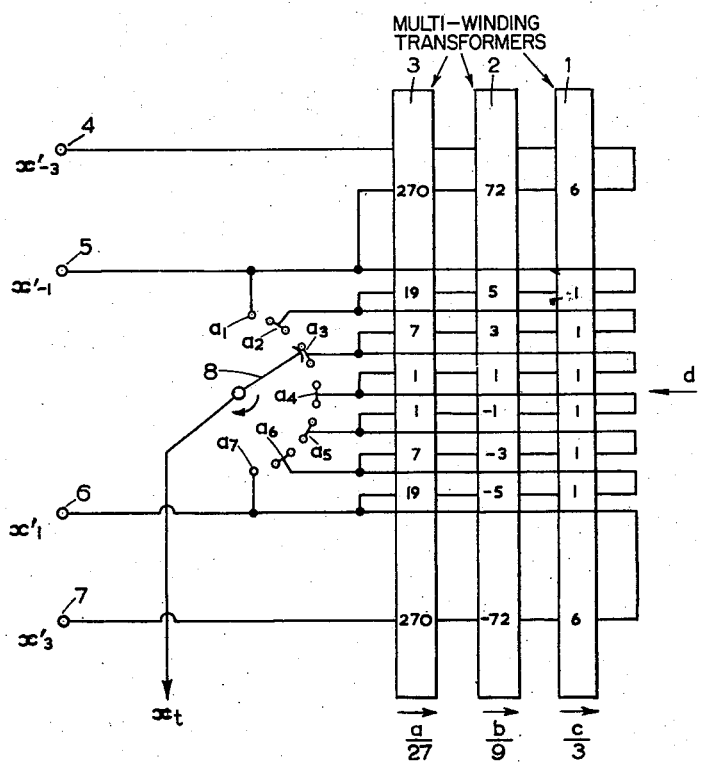
Figure 3:
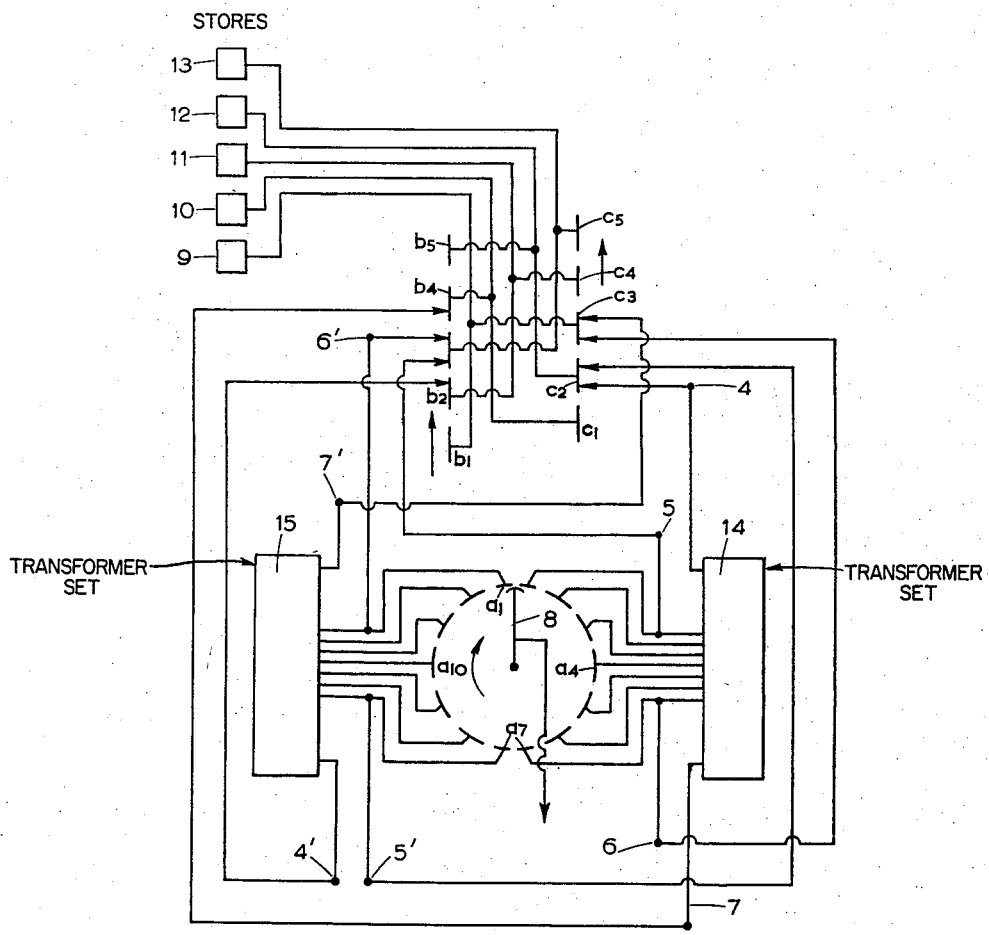
Figure 4:
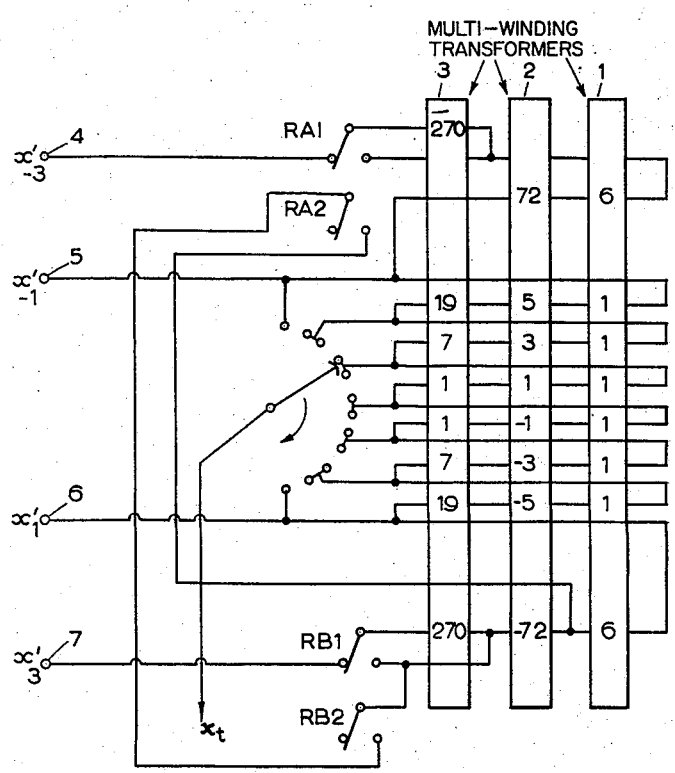
Figure 5:
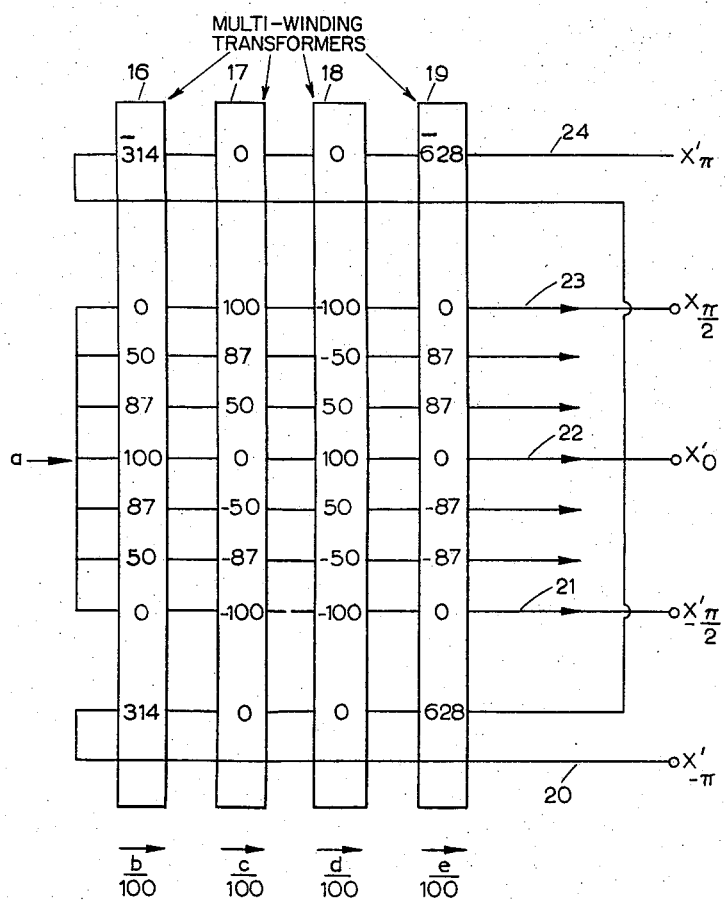
Figure 6:
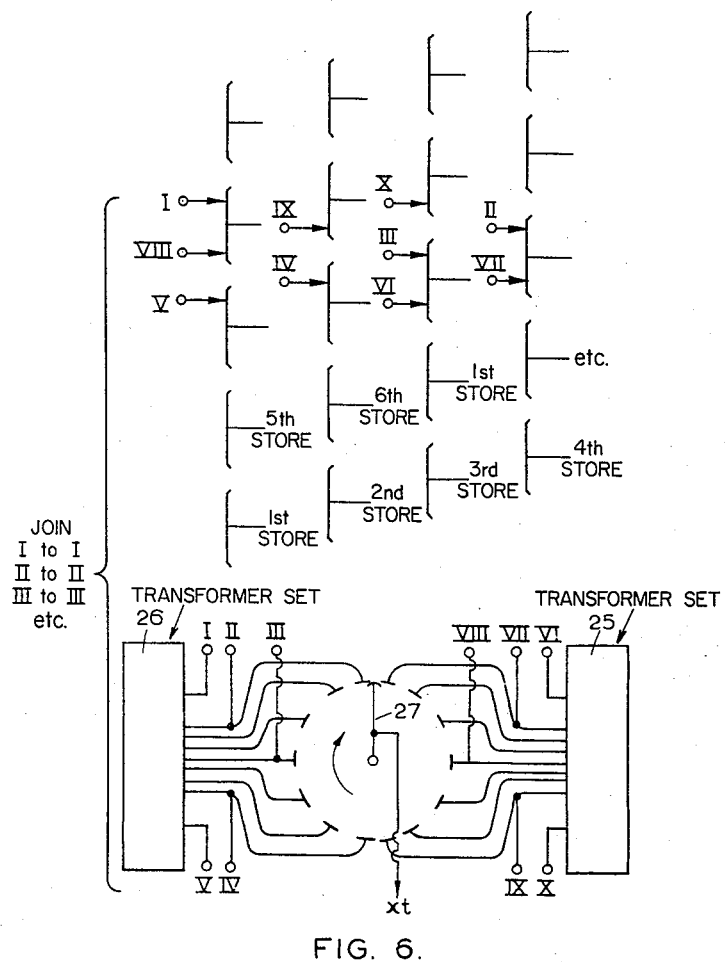

In order that the invention may be clearly understood and readily carried into effect, the invention will be described with reference to the accompanying drawings, in which:

FIGURE 1 is a diagram illustrating four reference points, the interpolation range being between the intermediate pair of reference points, FIGURE 2 illustrates in schematic form a single set of transformers in an interpolator according to an example of the present invention using four input signals, FIGURE 3 illustrates an arrangement for deriving a continuous output and embodying two interpolators of the construction shown in FIGURE 2, FIGURE 4 illustrates a modification of FIGURE 2 to enable corners to be negotiated, FIGURE 5 illustrates in schematic form a single set of transformers in an interpolator according to another example of the invention, having five input signals and employing a transcendental interpolation function, FIGURE 6 illustrates a method of connecting two sets of transformers according to FIGURE 5 to provide a continuous output.

Considering the case illustrated in FIGURE 1, in which the four reference points $P_{-3}$, $P_{-1}$, $P_1$, $P_3$, having ordinates $x^1_{-3}$, $x^1_{-1}$, $x^1_1$ and $x^1_3$ feeding an interpolator have arguments forming an arithmetric progression. The argument is expressed as a parameter $t$ which may for convenience be regarded as having the integral values $-3$, $-2$, $-1$, $+1$, $+2$ and $+3$ at points $P_{-3}$, $P_{-2}$, $P_{-1}$, $P_1$, $P_2$ and $P_3$ respectively. The slope at each reference point may be taken as that of the chord joining the reference points on either side of it. Thus the slope at $P_{-1}$ is equal to the slope of the chord $P_{-3}P_1$ and the slope at $P_1$ is equal to the slope of the chord $P_{-1}P_3$. The interpolation function can take for example the particular form $$x_t = at^3 + bt^2 + ct + d \qquad (1)$$

Let the slope of the interpolation function be $\dot{x}_t$ for any particular value of $t$ required so that, $$\dot{x}_t = 3at^2 + 2bt + c \qquad (2)$$

In the case where the range of interpolation derived from this set of reference points is from $x_{-1}$ to $x_1$ that is between $t=-1$ and $t=+1$ the four constraints are:

$x'_{-1} = x_{-1} = -a + b - c + d$
 (value at beginning of range) (3)
$x'_1 = x_1 = a + b + c + d$ (value at end of range) (4)
$\frac{1}{4}(x'_1 - x'_{-3}) = \dot{x}_{-1} = 3a - 2b + c$
 (slope at beginning of range) (5)
$\frac{1}{4}(x'_3 - x'_{-1}) = \dot{x}_1 = 3a + 2b + c$ (slope at end of range) (6)

These constraint equations are it is seen equivalent to the following equations:

$$x'_{-3} = -11a + 9b - 3c + d \qquad (7)$$
$$x'_{-1} = -a + b - c + d \qquad (8)$$
$$x'_1 = a + b + c + d \qquad (9)$$
$$x'_3 = 11a + 9b + 3c + d \qquad (10)$$

The interpolation function (1) may be set up by means of three transformers for the linear, quadratic and cubic terms in the function.

FIGURE 2 illustrates such an arrangement of three transformers. Rectangles referenced 1, 2 and 3 represent three transformers having toroidal cores. The input points 4, 5, 6 and 7 receive co-phasal alternating input signals having amplitudes representing $x'_{-3}$, $x'_{-1}$, $x'_1$ and $x'_3$. The point 4 is connected to a series of windings on the three cores. Windings are indicated on the transformers by a wire passing behind the rectangles and the number of turns of a winding is indicated by the number included in the figure at that point, a negative sign indicates turns in the negative sense. In the drawing, the convention is adopted that a winding has a positive sense if on the condition that $a$, $b$ and $c$ (which in operation of the arrangement are represented by the fluxes in the cores of the transformers 3, 2 and 1 respectively) are positive, the voltage increases on traversing the winding from left to right as seen in the drawing. Conversely a winding has a negative sense if, on the same condition the voltage decreases on traversing the winding from left to right. Obviously if a "positive" winding is traversed from right to left it must be treated as a negative winding. The point 4 is associated with six turns on 1, seventy-two turns on 2 and 270 turns on 3 connected in series. The other end of this series of windings is connected to the next input point 5 which is associated with further transformer windings as indicated. Between the input points 5 and 6 a further five intermediate series of transformer windings are associated with equally spaced contacts ($a1$ to $a7$) on a stud switch with moveable arm 8 from which the interpolated output $x_t$ is derived. The arm 8 is of the make-before-break type. The sets of transformer windings associated with these contacts are also connected in series as indicated.

An analysis of the number of turns in the various transformer windings and bearing in mind the sign convention, will reveal the following relationships. On the transformer 3 between the terminal 4 and the mid point $a_4$ there are $-270-19-7-1$ turns, namely $-297$ turns; between the terminal 5 and the point $a_4$ there are $-19-7-1$ turns, namely $-27$ turns; between the point $a_4$ and the terminal 6 there are $1+7+19$ turns, namely 27 turns; and between the point $a_4$ and the terminal 7 there are $1+7+19+270$ turns, namely 297 turns. Comparing the totals $-297$, $-27$, $+27$ and $+297$ with the co-efficients of $a$ in Equations 7 to 10, it will be observed that the number of turns are proportional to the co-efficients being in fact 27 times the co-efficients. Similarly it can be shown that, on the transformer 2 there are $-81$ turns between terminal 4 and the mid point $a_4$, $-9$ turns between terminal 5 and point $a_4$, and $-9$ turns between the point $a_4$ and terminal 6 and $-81$ turns between the point $a_4$ and the terminal 7. These totals are proportional to the co-efficients of $b$ in the Equations 7 to 10 being in fact $-9$ times the co-efficients. Similarly on the transformer 1 there are $-9$ turns between terminal 4 and the mid point $a_4$, $-3$ turns between terminal 5 and point $a_4$, $+3$ turns between point $a_4$ and terminal 6 and $+9$ turns between point $a_4$ and terminal 7. These totals are proportional to the co-efficients of $c$ in the Equations 7 to 10 being in fact 3 times the co-efficients. It is also to be noted that the term $d$ is common to all the Equations 7 to 10. Having regard to the foregoing considerations, when potentials are applied to the terminals 4, 5, 6 and 7 which can be expressed by the Equations 7 to 10, the whole system of transformers will "float" at a potential representative of $d$, or in other words the potential of the point $a_4$ is $d$, as indicated by the arrow on the figure. Furthermore there is induced in the core of the transformer 3 a flux variation of which the amplitude is proportional to $a$ and is such that there is induced across any secondary winding of this transformer a potential gradient or E.M.F. of $a/27$ volts per turn. There is induced in the core of the transformer 2 a flux variation of which the amplitude is proportional to $b$ and is such that there is induced across any secondary winding of this transformer a potential gradient or E.M.F. of $b/9$ volts per turn. Also, there is induced in the core of the transformer 1 a flux variation of which the amplitude is proportional to $c$ and is such that there is induced across any secondary winding of this transformer a potential gradient or E.M.F. of $c/3$ volts per turn.

The potential of any other point is then deduced from the potential of the mid-point by adding algebraically the potential differences across the intervening transformer windings, the positive direction being that of the arrows shown below rectangles 3, 2 and 1.

The potential of stud $a_4$ is therefore:

$$d = (0)^3 a + (0)^2 b + (0) c + d$$

and that of the stud $a_3$ is:

$$-a/27 + b/9 - c/3 + d = (-\tfrac{1}{3})^3 a + (-\tfrac{1}{3})^2 b + (-\tfrac{1}{3}) c + d$$

and that of stud $a_5$ is:

$$a/27 + b/9 + c/3 + d = (+\tfrac{1}{3})^3 a + (+\tfrac{1}{3})^2 b + (+\tfrac{1}{3}) c + d$$

and that of stud $a_1$ is:

$$a + b + c + d = (1)^3 a + (1)^2 b + 1c + d$$

Further, the potential of the line 7 is:

$$-11a + 9b - 3c + d$$

so that the constraint expressed by Equations 7 and 9 are seen to have been applied to the arrangement and similarly it is clear that the constraint expressed by Equations 8 and 10 have also been applied to the arrangement. The arrangement is therefore completely constrained and the parameters $a$, $b$, $c$, $d$ assume the unique values which are determined by $x'_{-3}$, $x'_{-1}$, $x'_1$, $x'_3$ and ensure the required boundary conditions at the ends of a range of interpolation. The moving arm 8 clearly picks off interpolated values on a curve between $x'_1$ and $x'_{-1}$.

In order that continuous interpolation may be effected, the reference input signals must be able to be changed and for this it is necessary to employ a pair of arrangements as described above.

In FIGURE 3 there is illustrated as aforesaid a complete interpolator according to the invention which is suitable for use in a control mechanism for an automatic machine. The rectangles 9, 10, 11, 12 and 13 denote stores for alternating input signals to the interpolator. These input signals may for example be derived from a record tape by a tape reader but since the tape reader forms no part of the present invention it is not shown in the figure. The stores however may be as described in patent application No. 34,219/53 and the five outputs from the stores are connected to contacts $b1$ and $c3$, $c1$ and $b4$, $b2$ and $c4$, $c2$ and $b5$ and $b3$ and $c5$ respectively of two sets of contacts $b1$, $b2$, ... $b5$ and $c1$, $c2$, ... $c5$ of a pair of stud switches. Although shown as straight banks, these switches are of circular form and each has four moveable contacts which move forward in unison in the direction of the arrows shown. The switches may for example be of the uniselector type if desired.

The rectangles 14 and 15 represent sets of transformers as herein described with reference to FIGURE 2, 14 consisting of transformers 1, 2, 3 and 15 consisting of corresponding identical transformers to be referred to as $1'_1$, $2'_1$, $3'_1$ but these are not shown. A complete circle of studs $a1$, $a2$ ... $a12$ is now provided for the interpolated switch with moving contact 8, studs $a1$, $a2$ ... $a7$ of this switch are associated with 14 and studs $a_7$, $a_8$ ... $a_1$ are associated with 15. Studs $a1$ and $a7$ are composed of two half studs each, as shown in the figure. The sense of motion of 8 is shown by the arrow. The input points for 14 are allocated identical references to those in FIGURE 2 and those for 15 which correspond to 4, 5, 6, 7 in FIGURE 2 will be identified as $4'$, $5'$, $6'$, $7'$. The input signals for the two interpolators are derived in cyclic order from the eight moving contacts on the "$b$" and "$c$" interpolator switches.

In operation of the arrangement of FIGURE 3, the interpolator switch contact arm 8 rotates at constant speed and is geared in known manner to the store switch contacts so that for a single revolution of 8 the store switch contacts move from a position relative to one stud to a similar position relative to the next stud reached. It is arranged that a change of input signals to the interpolators occurs approximately when 8 is at $a_4$ or at $a_{10}$. Considering the state of the switches existing in the figure, the interpolator contact 8 is about to finish a span of the outputs from 15 and to commence a span of the outputs of 14 and it may be considered that stores 11, 12, 13, 9 and 10 carry alternating signals representing five successive reference points in that order. Clearly since input points 6' and 5 are connected to the same store no jump can occur in the output derived from 8 at changeover at $a_1$ from the 15 to 14, and also since for the span of the studs $a_1$ to $a_7$ for 14, the input point 4 now receives the same input signal as the input point 5' for the previous span, and the input point 6 receives the same input as did the input point 7' for the previous span, the slope of the interpolated curve at the changeover point is continuous so that no "corner" occurs there. As the contact 8 passes $a_4$, while providing interpolation between the third and fourth reference points the contact about to leave $b_2$ leaves $b_2$ and the store 11 is cleared of the first reference point and a signal representing a sixth reference point is stored in 11 from the tape reader. At $a_7$, the output is again derived from 15, no undesired discontinuities occurring at the changeover and interpolation is then effected between the fourth and fifth reference points. On passing $a_{10}$ the lowest store switch contact moves off $c_2$ and store 12 is cleared and a signal representing a seventh reference point is stored there. It is clear that the correct sequence of stores are connected by the store switches to the input points of the two sets of transformers 14 and 15.

It is evident that because of the constraints imposed upon the interpolation function the arrangement of FIGURE 3 normally can provide only a smooth curve. Sharp corners may, in so far as the invention hereto described is concerned, not be negotiated.

Referring to FIGURE 4 however, which is a modification of FIGURE 2 to provide sets of transformers which can be used for the interpolator of FIGURE 3, when corners are to be negotiated, references RA1, RA2 and RB1, RB2 are pairs of relay switches. The contacts of RA1 and RA2 are ganged to operate together and the contacts of RB1 and RB2 are ganged to operate together and both pairs are normally in the positions indicated. RA1 when not in its normal position is effective to open-circuit the input point 4 and short-circuit the transformer 3 and RB1 is similarly effective to open-circuit the input point 7 and short-circuit the transformer 3. When both RA1 and RB1 are in their abnormal states RA2, and RB2 form a series loop to short-circuit the transformer 2. In order to provide for negotiation of corners at reference points rectangles 14 and 15 in FIGURE 3 may comprise modified arrangements according to FIGURE 4. The corresponding relay switches in 15 will be referred to as RA1', RA2', RB1', and RB2'.

In operation of this modified example of the invention, assume a corner is required at a reference point corresponding to a changeover from the set of transformers 15 to the set of transformers 14. The corner is therefore required when the brush 8 is on the stud $a_1$. To achieve the corner, during the whole of the interpolation range when the output potential is derived from 15, switch RB1' is set in its abnormal position and during the whole of the next interpolation range when the output is derived from 14, switch RA1 is set in its abnormal position. When switches RB1' and RA1 are in their abnormal positions and so also are the switches RB2' and RA2 respectively but these latter switches have no effect in the operation of the arrangement when only one switch pair in each transformer set is in abnormal position. The effect of the switch operations is to disconnect points 4 and 7' and suppress the constraint upon the gradient of the interpolated curve on either side of the reference point at which a corner is required and in addition, by short circuiting the cubic transformers the corresponding degree of freedom in each set of transformers is temporarily removed. With the cubic transformer short-circuited the interpolation function is quadratic and is of the form:

$$x_t = bt^2 + ct + d \quad (1')$$

The slope at a point "$t$" is therefore $$\dot{x}_t = 2bt + c \quad (2')$$

The constraints now applied are:

$$x_{-1'} = b - c + d \text{ (value at beginning of range)} \quad (3')$$
$$x_{-1'} = b + c + d \text{ (value at end of range)} \quad (4')$$
$$\tfrac{1}{4}(x'_3 - x'_{-1}) = 2b + c \text{ (slope at end of range)} \quad (6')$$

And the equivalent set of constraints is:

$$x'_{-1} = b - c + d \quad (8')$$
$$x'_1 = b + c + d \quad (9')$$
$$x'_3 = 9b + 3c + d \quad (10')$$

A corner is therefore in general negotiated by suppressing the constraint of the interpolation function with regard to the slope of the curve on both sides of the corner.

If furthermore it is required to provide negotiation of corners at two successive reference points, RA1 and RB1' may be set to their abnormal positions for negotiation of the first corner as described above, but for negotiation of the second corner which in this case may be assumed to occur at a changeover of 8 at $a_7$, the switches RB1 and RA1' are also appropriately set to their abnormal positions for the interpolation range correspond to a transverse of 8 over output studs of 14. Both switch pairs in the transformer set 14 are now simultaneously in their abnormal positions. The loop containing RA2 and RB2 is therefore closed so that the transformer 2 is short-circuited. This is necessary in this case since although two constraints are removed from the set of transformers by RA1 and RB1 only a single degree of freedom is removed in the absence of the loop containing RA2 and RB2. Similarly, when a corner is provided at each end of a span for $a_7$ to $a_1$ of the interpolator switch, the switches RA2' and RB2' must necessarily be in their abnormal state for the whole of this range.

In the example of the invention described above, only four reference points are used to determine each span of the interpolator but in general it may be desirable from the point of view of accuracy to build into the interpolator additional constraints such as the value at the mid point of each range, this may be effected provided that an additional degree of freedom is introduced for each constraint imposed. The form of the interpolation function employed for the present invention is moreover not important but the number of parameters related by the interpolation function must equal the number of constraints applied.

A transcendental interpolation function may if desired be employed since in general, the curve represented by the function:

$$x_t = a_0 + a_1 \cos t + a_2 \cos 2t + \ldots + a_n \cos nt$$
$$+ b_1 \sin t + b_2 \sin 2t + \ldots + b_n \sin nt$$

may by choice of the coefficients $a_0 \ldots a_n$ and $b_1 \ldots b_n$ be made to satisfy $2n+1$ constraints.

Assuming for example that five reference points are available and therefore five constraints the interpolation function can be of the form $$x_t = a + b \cos t + c \sin t + d \cos 2t + e \sin 2t$$

and the slope at any particular point "$t$" is $$x_t = -b \sin t + C \cos t - 2d \sin 2t + 2e \cos 2t$$

If the reference points are:

$$X'_{-\pi}, X'_{-\pi/2}, X'_0, X'_{\pi/2}, X'_\pi$$

an additional constraint in the mid point of the range of interpolation is now imposed and the constraints are:

$X'_{-\pi/2} = a - c - d$ (value at the beginning of the range) (11)

$X'_0 = a + b + d$ (value at the mid point of the range) (12)

$X'_{\pi/2} = a + c - d$ (value at the end of range) (13)

$$\frac{X'_0 - X'_{-\pi}}{\pi} = b - 2e \text{ (slope at the beginning of range)}$$
(14)

$$\frac{X'_\pi - X'_0}{\pi} = -b - 2e \text{ (slope at the end of the range)}$$
(15)

which may be instrumented without further transformation.

In FIGURE 5 are shown four toroidal transformer cores denoted as rectangles 16, 17, 18 and 19 in a similar manner to those of FIGURE 2. These toroids carry windings also denoted in a similar manner to those of FIGURE 2. The potential gradients per turn are for convenience arranged to be $b/100$, $c/100$, $d/100$ and $e/100$ respectively. The equally spaced span windings on 16 are arranged as the function $\cos t$, those of 17 represent $\sin t$, those of 18 represent $\cos 2t$ and those of 19 represent $\sin 2t$. When the alternating reference signals representing $X'_{-\pi} \ldots X'_\pi$ are applied to the input wires 20, 21, 22, 23 and 24 as shown, it is seen that the constraints laid down by Equations 11–15 are imposed upon the interpolation function in a similar way to the way in which Equations 7 to 10 apply to FIGURE 2 but the slope constraints are determined by the difference between the input signals representing the $X_\pi X_{-\pi}$ points and the central points of the range of interpolation.

In order to employ the set of transformers of FIGURE 5 for continuous interpolation it is necessary as it is for FIGURE 2 to duplicate the set of transformers and provide a continuously rotating contact switch to the studs of which are connected the output wires from the interpolators. Switching means must also be provided for applying input reference signals. Although such an arrangement will present no difficulty to those skilled in the art in view of the interpolator described with reference to FIGURE 3, a suitable arrangement is indicated in FIGURE 6.

In FIGURE 6 rectangules 25 and 26 represent transformer sets as illustrated in FIGURE 5 and the outputs are connected to a stud switch having a rotating contact 27. Half studs are employed at changeover positions as mentioned above. Four store switches are provided, two having three moving contacts each and the other two having two moving contacts each. These contacts are connected to the reference inputs for the transformer sets as indicated for simplicity by Roman numerals I to X and for each half revolution of 27, the contacts are stepped forward one position. The stores for the alternating reference signals are not shown but are six in number and may be similar to those employed in the interpolator of FIGURE 3. The stores are associated with studs on the store switches as indicated. Operation of the interpolator of FIGURE 6 is not further described as it is clear in view of the description of the first example of the invention.

In the interpolator of FIGURE 5 short circuiting switches may clearly be employed to provide for the negotiation of corners at changeover points as required in a similar manner to those provided for the interpolator of FIGURE 2.

Although the number of windings on each transformer corresponding to points in the range of interpolation is in the example described only six or seven, the number may clearly be increased to any suitable desired number and additional output points will then be provided on the stud switches.

In addition although not described herein, linear sub-interpolation as described for example in United States patent application Serial Number 459,814, now Patent No. 2,928,604, which provides for linear interpolation between the discrete outputs at successive studs on the interpolator switch may be provided if desired.

Although moreover in the examples of the present invention described herein, the slopes at the changeover points from the interpolators are taken to be those of chords joining reference points on each side of the points considered, the principle of the invention is unaffected if the slope at a changeover point is taken to be any other linear combination of the reference points common to the two adjacent sets. Similarly additional constraints imposed upon the interpolation function need not necessarily be values, they can take the form for example of an intermediate slope in the interpolation range. In fact, any set of constraints may be applied in a manner according to the invention subject to the following conditions:

(1) The set of constraints must be linearly independent.

(2) The set of parameters of the interpolation function must be linearly independent and the same in number as the constraints imposed on the interpolation function.

(3) Each constraint must express a linear dependence of the union of the set of parameters and the set of reference points of the interpolation range.

This is the case since subject to those conditions the set of constraints may be transformed into the set expressing each reference point of the range explicitly as a linear combination of the parameters of the interpolation function.

What I claim is:

1. An interpolating device comprising at least four input terminals corresponding to a series of relatively widely spaced values of an argument, a series of output terminals corresponding to closer values of said argument, at least three transformers, said input and output terminals being connected each to each by selected windings of said transformers, the turns ratios of the windings of the respective transformers being predetermined to produce at said output terminals, in response to alternating signals applied to said input terminals, a series of signals having amplitudes which conform to a section of a curve which begins at a point determined by the amplitude of the signal applied to the second of said input terminals, ends at a point determined by the amplitude of the signal applied to the second last of said input terminals, has its slope at the beginning point determined by the amplitude difference between the signals applied to the first and third of said input terminals, and has its slope at the end point determined by the amplitude difference between the signals applied to the third last and last of said input terminals.

2. An interpolating device according to claim 1, selected windings on said transformers corresponding to values of said argument, the number of turns on windings of a first transformer being chosen according to a linear law, the number of turns on windings on a second transformer being chosen according to a second power law and the number of turns on windings on a third transformer being chosen according to a third power law and so on, with respect to the value of the argument represented at said output points.

3. An interpolating device according to claim 1, selected windings on said transformers corresponding to values of said argument, the number of turns of selected windings on first and second transformers being predetermined respectively according to sinusoidal and cosinusoidal laws in respect to said argument, the number of turns of selected windings on third and fourth transformers and so on being predetermined respectively according to sinusoidal and cosinusoidal laws in respect of multiples of said argument to correspond to terms in a Fourier Series, the number of degrees of freedom for the function defining said curve being predetermined to equal the number of input signals received at one time.

4. An interpolating or extrapolating device according to claim 1, means being provided for shortcircuiting one of said transformers, to remove a degree of freedom for said function.

5. An interpolating device according to claim 1 having three transformers and four input terminals, and having the turns ratios of the windings of one of said transformers related by a cubic law to the spacings of the values of the argument corresponding to the respective terminals, and having the turns ratios of the windings of a second of said transformers related by a quadratic law to the spacings of the values of the argument corresponding to the respective terminals, and having the turns ratios of the windings of the last of said transformers related by a linear law to the spacings of the values of the argument corresponding to the respective terminals.

6. An interpolating device according to claim 1 having five input terminals and four transformers, and having the turns ratios of a first and second of said transformers related by sinusoidal and co-sinusoidal laws respectively to the spacings of the values of the argument corresponding to the respective terminals, and having the turns ratios of the windings of the third and fourth of said transformers related by sinusoidal and co-sinusoidal laws respectively, to multiples of the spacings of the values of the arguments corresponding to the respective terminals.

References Cited in the file of this patent

UNITED STATES PATENTS

| | | |
|---|---|---|
| 2,659,849 | Cunningham | Nov. 17, 1953 |
| 2,662,144 | Wilentchik | Dec. 8, 1953 |
| 2,662,147 | Wilentchik | Dec. 8, 1953 |
| 2,781,967 | Spencer et al. | Feb. 19, 1957 |
| 2,784,359 | Kamm | Mar. 5, 1957 |
| 2,928,604 | Dudman | Mar. 15, 1960 |

FOREIGN PATENTS

| | | |
|---|---|---|
| 389,524 | Great Britain | Mar. 20, 1933 |

OTHER REFERENCES

Electronic Engineering (Mynall), June 1947, pp. 178–180.

Analog Methods in Computation and Simulation (Soroka), 1954, pp. 144 and 145.

Journal of Association for Computing Machinery (Moshos), April 1955, pp. 83–91.